United States Patent
Heuke

[19]

[11] Patent Number: 6,021,596
[45] Date of Patent: Feb. 8, 2000

[54] WIND DRIVEN JIGGING DEVICE ON A BUCKET

[76] Inventor: Thomas E. Heuke, 619 Garfield St., Lincoln, Nebr. 68502

[21] Appl. No.: 09/080,584

[22] Filed: May 18, 1998

Related U.S. Application Data

[60] Provisional application No. 60/047,643, May 22, 1997.

[51] Int. Cl.$^7$ ................................................. A01K 97/12
[52] U.S. Cl. ............................................................ 43/19.2
[58] Field of Search ............................................ 43/19.2

[56] References Cited

U.S. PATENT DOCUMENTS

| | | | |
|---|---|---|---|
| 2,122,836 | 7/1938 | Gegerfeldt | 43/19.2 |
| 2,643,478 | 6/1953 | Paulson | 43/19.2 |
| 3,599,369 | 8/1971 | Carlson | 43/19.2 |
| 3,623,259 | 11/1971 | Rode | 43/19.2 |
| 4,077,149 | 3/1978 | Enquist | 43/19.2 |
| 4,662,099 | 5/1987 | Stewart | 43/19.2 |
| 5,412,898 | 5/1995 | Crain | 43/19.2 |
| 5,638,628 | 6/1997 | Davis | 43/19.2 |

*Primary Examiner*—Kurt Rowan

[57] ABSTRACT

A wind dependent jigging device for ice and dock fishing with a jigger rod (22) mounted on a bucket (20) that uses wind gusts to oscillate jigger rod (22). Wind gusts hit wind catch (42) on crank rod (26) from the rear side of wind catch (42) to cause pivot rod (28) to rotate in oscillation guides (34A) and (34B) to lift jigging arm (32) to cause hook (58) attached to fishing line (56) attached to line clip (52) on jigging arm (32) to move up and down randomly in frequency and degree depending on wind gust strength. Translational pivot guide (34D) adds another component to the up and down jigging stroke by creating a pull stroke and a bump as pivot rod (28) moves in translational pivot guide (34D). Balance weights (46A) and (46B) help balance and adjust the jigger rod (22) and create bumps that make hook (58) jump to create unique jigging action. Jigger rod (22) is detachable from bucket (20) by removing from oscillation guides (34A) and (34B) through jigger rod removal slots (36A) and (36B). Jigger rod (22) is removable from pivot guide (34C) and translational pivot guide (34D) through jigger rod removal slots (36C) and (36D). Jigger rod (22) can be taken apart at pivot rod union (40) for easy transport in bucket (20) with other fishing tackle. Pivot rod union (40) allows for many different configurations of jigger rod (22).

20 Claims, 4 Drawing Sheets

WIND DRIVEN JIGGING DEVICE ON A BUCKET

CROSS-REFERENCE TO RELATED APPLICATIONS

Provisional Patent Application No. 60/47,643 filed May 22, 1997

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This device relates to fishing, specifically to the type of fishing called jigging and the use of wind currents to effect jigging in the device.

Jigging is the practice of moving a lure or bait up and down in the water for periods of time at different depths to locate, attract, and capture fish. This particular method of fishing is popular during ice fishing, where the angler stands directly above the hole in the ice and moves the bait up and down. This invention goes beyond simple lift and drop jigging to effect more activity in the attached lure or bait. Attempts have been made to transfer this motion to machines or devices so that several lines can be jigged at the same time while the angler watches. Many approaches have been used but the ones of particular interest have attempted to use the wind to cause jigging.

With U.S. Pat. No. 2,663,962, Dec. 29, 1953, King used a teetering arm balanced in the middle by a pin and weight acting as a pendulum, with a fish line on one end and a wind vane on the other that was activated by cross winds. This device was based on one of the six simple machines, the class I lever. All class I levers have a bar that is free to turn about a fixed point called a fulcrum, which may be placed at any point between the effort arm (wind vane) and the load (fish line and hook). A number of devices subsequently appeared that were very similar in structural appearance and function. They are represented by:

U.S. Pat. No. 2,732,649, Jan. 31, 1956, Tuttle
U.S. Pat. No. 2.934.849, May 3, 1960, Kampa
U.S. Pat. No. 2,967,640, Mar. 28, 1961, Sensenbrenner
U.S. Pat. No. 4,373,287, Feb. 15, 1983, Grahl
U.S. Pat. No. 4,567,686, Feb. 4, 1986, Akom
U.S. Pat. No. 4,642,930, Feb. 17, 1987, Graf Their differences were not significantly great but involved signaling devices, hooking devices, line spools, wind vanes, and balancing weights. They, however, all similarly used the class I lever approach, utilizing a pivoting straight bar (teeter totter design), not much different than what King first suggested in U.S. Pat. No. 2,663,692 in 1953. They all followed the original "tip-up" design suggested by Cedric Wells in *Popular Mechanics*, February 1939. By using a straight bar, all the devices needed a substantial foundation from which they could pivot. The foundations or bases had to have designs that allowed them to fold up so they could be transported. This resulted in extra time in setting up when starting to fish and breaking down when finished fishing. Five or six of these devices could add considerable weight and space when transporting them to the fishing site.

U.S. Pat. No. 4,033,062, Jul. 5, 1977, Denecky, presented a slightly different look in his device, having a wind vane facing into the wind, on the same side of the fulcrum as the fishing line, and a special fish hooking device. The class I lever was again used in this device.

All the devices cited use a straight (in a line) lever, with the foundation or base as the fulcrum. No attempts at anything other than the straight class I lever approach have been attempted. None could be adapted to fit a bucket as a foundation due to the straight teetering bar, as the bucket would be in the way. They also try to incorporate signaling devices, line spools, and hooking devices, that could interfere with the main function of the device, to oscillate or jig the bait. They can be hard to balance with some of these things actually mounted on the arm itself. None of these devices utilize designs that would allow an angler to use a separate fishing rod where the fishing line can immediately be removed from the device upon hooking the fish and the fish then played and landed in a normal fashion on the fishing rod. When the fishing line cannot be removed from the device, it severely limits the angler's ability to land an extremely large fish as the angler would be disadvantaged without a rod that bends and the use of a drag on a fishing reel, resulting in the large fish breaking the line.

The prior art utilize simple two dimensional up and down jigging, failing to capture the third dimension. The present invention captures all three dimensions.

BRIEF SUMMARY, OBJECTIVES AND ADVANTAGES OF THE INVENTION

This invention utilizes an important addition to the angler's tackle the last decade or so, the plastic bucket. These light weight plastic buckets are now a common sight as anglers fill them with fishing tackle, bait, and their catch, or just use them to sit on. It would be unusual that an ice angler would not have a plastic bucket with him because they are so handy. Since they are being used and normally carried along anyway, now they can have a new use as a base for a wind driven automatic jigger as the present invention suggests. The angler doesn't need to increase his equipment weight, and may actually reduce it significantly, since the present invention separate from the plastic bucket, weighs just ounces and snaps right onto the bucket with a few simple bucket modifications. It is not uncommon for ice anglers to carry several plastic buckets with them. However, if extra buckets are needed, they are made so that they can be easily stacked on each other, talking up little room, and then easily carried as one unit.

The present invention incorporates complex movements in three dimensions (in contrast to just up and down movement) and utilizes different ways to cause bumps that result in jumps in the lure or bait. The invention attracts fish to the area by sight and noise production, and can catch the fish when they bite.

Objectives and Advantages

1. To provide a fishing jigger that easily attaches to a bucket for use, detaches from the bucket for transport, and doubles as a device to carry fishing tackle;

2. To provide an easy to use wind driven ice fishing jigger for anglers of all ages; simple to use because it is based on a simple machine, the axle and crank;

3. To provide a jigger that is very light and easy to carry (or transport) to destination;

4. To provide a jigger that produces variable amounts of jigging including a different range of depths of jigging in succession, without adjustment each time;

5. To provide a jigger very sensitive to wind forces; purely a balanced device not burdened with spools, signaling devices, and hooking devices on the balance arms that might interfere with the objective of jigging the bait;

6. To provide a jigger that is economical to manufacture;

7. To provide a jigger that is adjustable to strong or weak winds;

8. To provide a jigger that does what other wind devices do, except in a much simpler and more wind sensitive way, creating a new vibrating and bait jumping action in addition to the lift and drop action;

9. To provide a jigger that can be used with a separate fishing rod and reel and the fishing line easily removed from the device so the angler can enjoy playing and landing the fish, and won't have to bring the line in hand over hand getting gloves or hands wet in ice cold weather;

10. To provide a jigger that can be moved to another hole in the ice very quickly, by using a bucket handle for short distance transportation;

11. To provide a jigger that besides having up and down or lift and drop action, also has translational movement incorporated in the action;

12. To provide a jigger that can be used for dock and ice fishing,

The above objects and advantages will become apparent from consideration of the forthcoming description.

BRIEF DESCRIPTION OF DRAWING FIGURES

Figure 1:
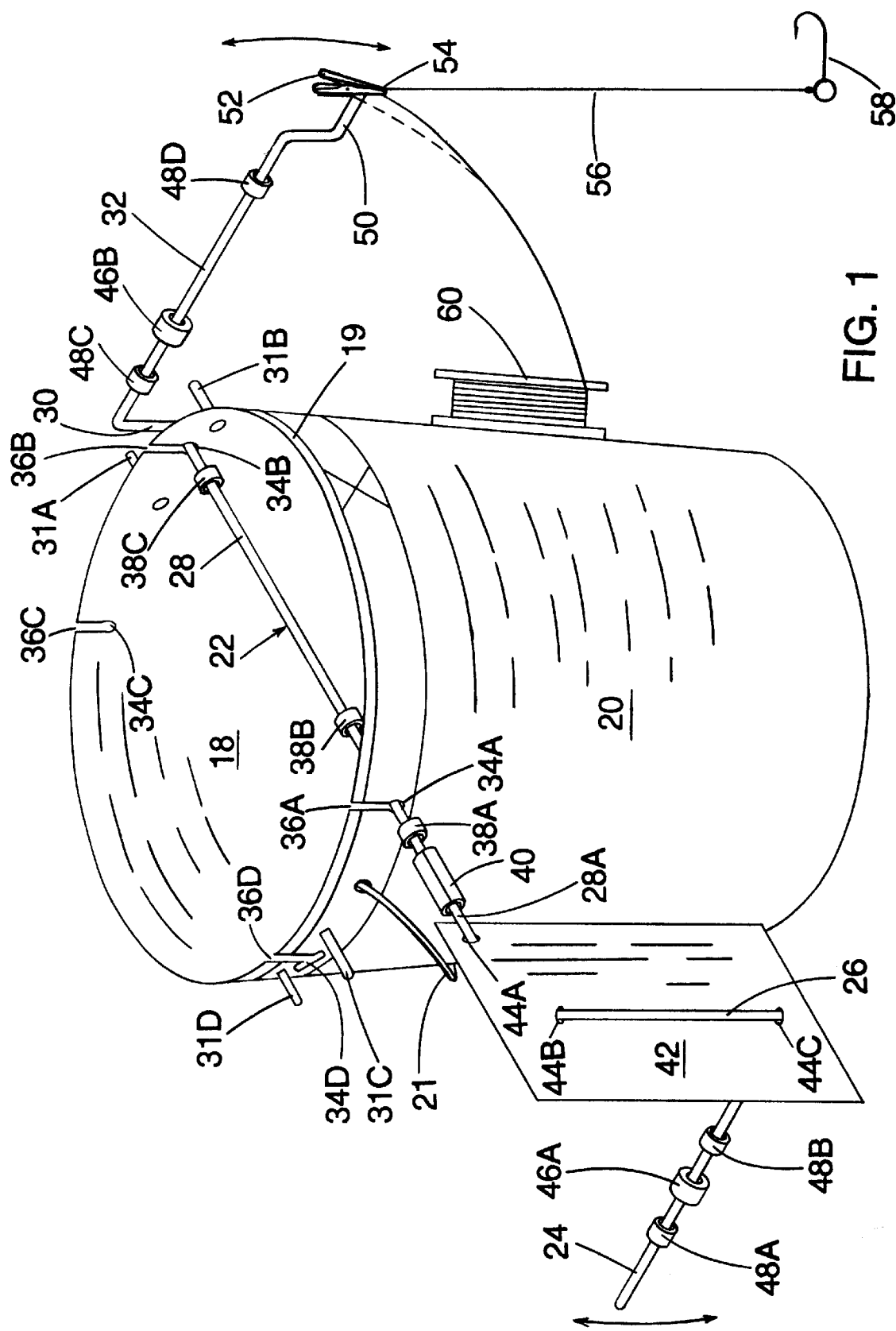
FIG. 1 shows a perspective view of the wind driven jigging device on a bucket, embodiment A.

List of Reference Numerals in Drawings 18 bucket opening
19 rim
20 bucket
21 handle
22 jigger rod
24 balancing arm
26 crank rod
28 pivot rod
28A pivot rod extension
30 rotation limiter
31A limit pin
31B limit pin
31C limit pin
31D limit pin
32 jigging arm
34A oscillation guide
34B oscillation guide
34C pivot guide
34D translational pivot guide
36A jigger rod removal slot
36B jigger rod removal slot
36C jigger rod removal slot
36D jigger rod removal slot
38A pivot rod positioner
38B pivot rod positioner
38C pivot rod positioner
40 pivot rod union
42 wind catch
44A wind catch mounting hole
44B wind catch mounting hole
44C wind catch mounting hole
46A balance weight
46B balance weight
48A balance weight positioner
48B balance weight positioner
48C balance weight positioner
48D balance weight positioner
50 line retainer
52 line clip
54 clip beaks
56 fishing line
58 hook
60 line spool
60A line spool

DETAILED DESCRIPTION OF THE INVENTION

Description of Drawing Figures

FIG. 1, showing a perspective view of embodiment A of the present invention, has a bucket 20 with a handle 21 and a jigger rod 22. Bucket 20 has a bucket opening 18 and a rim 19. Jigger rod 22, transversing bucket opening 18, has several members; a balancing arm 24, a crank rod 26, a pivot rod 28, a pivot rod extension 28A, a rotation limiter 30, and a jigging arm 32. Bucket 20 has a pair of oscillation guides 34A and 34B straddling bucket opening 18, so they appear on opposite sides of bucket 20. Oscillation guides 34A and 34B have jigger rod removal slots 36A and 36B that open on rim 19. Pivot rod 28 rests in oscillation guides 34A and 34B. Oscillation guides 34A and 34B are round and slightly larger than the diameter of pivot rod 28 which passes through them, so free movement or oscillation is possible of jigger rod 22. On pivot rod 28 are two pivot rod positioners 38A and 38B on each side of oscillation guide 34A and one pivot rod positioner 38C, next to oscillation guide 34B. On one end of pivot rod 28 is a pivot rod union 40 joined to pivot rod extension 28A. Pivot rod 28 and pivot rod extension 28A are separated within pivot rod union 40 (see FIG. 3). Pivot rod union 40 is a steel slotted spring dowel pin (also called tension pin and roll pin), having a separation throughout it's length, allowing one end of pivot rod extension 28A and one end of pivot rod 28 to be frictionally retained within pivot rod union 40. The other end of pivot rod extension 28A is continuous and at a right angle with crank rod 26. Mounted on crank rod 26 is a wind catch 42 by three wind catch mounting holes 44A, 44B, and 44C. Wind catch 42 is made of a light weight plastic sheet material. Continuous with and part of crank rod 26 is balancing arm 24. Crank rod 26 and balancing arm 24 meet at a right angle. On balancing arm 24 is balance weight 46A, held in place by two balance weight positioners 48A and 48B, one on each side of balance weight 46A. Balance weight 46A is cylindrical with a hole in the middle for mounting and moving freely on balance arm 24. On the other end of pivot rod 28, continuous with it, and at a right angle with it, is rotation limiter 30, which is part of jigging arm 32. Jigging arm 32 and rotation limiter 30 are at a right angle. Limit pins 31A and 31B are mounted on bucket 20 with oscillation guide 34B located between them. Jigging arm 32 has cylindrical balance weight 46B held in position by two balance weight positioners 48C and 48D, one on each side of balance weight 46B. On the terminal end of jigger arm 32 and included as part of jigger arm 32 is a line retainer 50. Line retainer 50 is a U shaped loop on the terminal end of jigging arm 32. On line retainer 50 is a line clip 52 with clip beaks 54. A fishing line 56, with a hook 58 on it's terminal end, is held by clip beaks 54. Fishing line 56 comes from a separate fishing rod (not shown) or from an optional line spool 60 mounted on bucket 20. The dotted line shows an alternative position of line 56, looped over line retainer 50, rather than being held between clip beaks 54.

Figure 2:
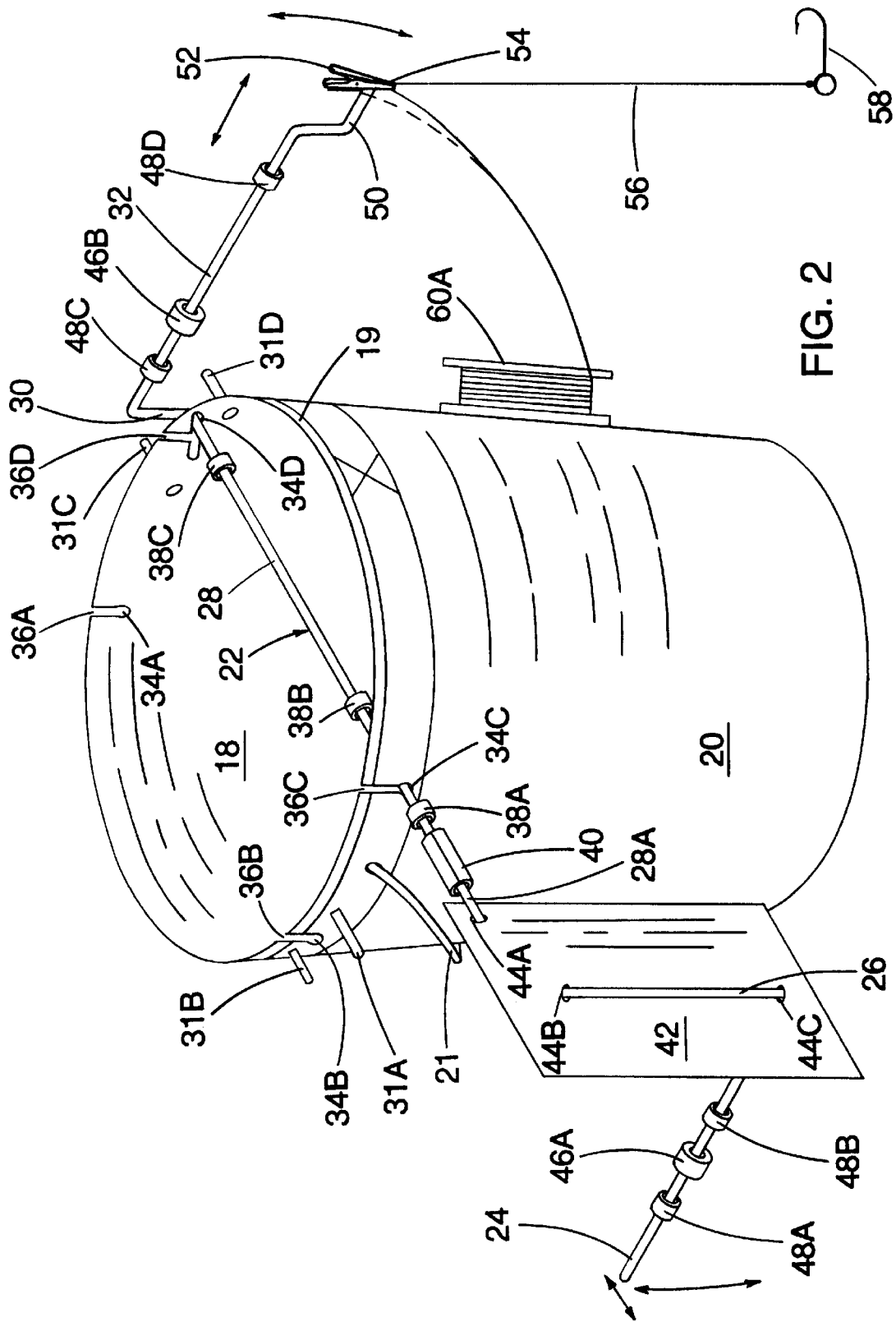
FIG. 2 shows a perspective view of the wind driven jigging device on a bucket, embodiment B.

To summarize, jigger rod 22 has three main functional parts consisting of it's middle part and the two ends. Pivot rod 28 and it's pivot rod extension 28A joined together by pivot rod union 40 are in the middle. On one end is jigging arm 32 with it's rotation limiter 30 and line retainer 50. On the other end is crank rod 26 and it's balancing arm 24. As shown in FIG. 1 and FIG. 2, balancing arm 24, pivot rod extension 28A, pivot rod 28, and pivot rod union 40 have a horizontal orientation on bucket 20. Crank rod 26 has a vertical orientation. Rotation limiter 30 and jigging arm 32 can have any orientation between horizontal and vertical due to pivot rod union 40. This relationship of pivot rod union 40 and jigging arm 32 will be discussed in detail in the following section of Detailed Operation of the Invention.

Jigger rod 22 has some flexibility, and is 3/32 inch (2.38 mm) metal wire. All positioners are flexible plastic tubing just slightly under 3/32 inch inside diameter with 5/32 inch outside diameter, that fit snugly on jigger rod 22, but can be forcefully moved along jigger rod 22 to appropriate places.

In FIG. 1, bucket 20 also has a pivot guide 34C and a translational pivot guide 34D with jigger rod removal slots 36C and 36D, respectively, which are used in embodiment B. In FIG. 2 pivot guide 34C and translational pivot guide 34D straddle bucket opening 18. Jigger rod removal slots 36C and 36D open on rim 19. Translational pivot guide 34D is a special guide with a sloped slot rather than a round hole. The slot of translational pivot guide 34D is sloped, the highest point being nearest line retainer 50 and it's lowest point being farthest from line retainer 50 when jigger rod 22 is placed in pivot guide 34C and translational pivot guide 34D. The slot of translational pivot guide 34D is slightly larger than the diameter of pivot rod 28 to allow free movement of pivot rod 28 within the slot. Translational pivot guide 34D is located between limit pins 31C and 31D. FIG. 2 shows bucket 20 rotated 180° from the position shown in FIG. 1 and jigger rod 22 now is occupying translational pivot guide 34D and pivot guide 34C, which were previously unoccupied in FIG. 1, to demonstrate embodiment B. Line spool 60A (not visible in FIG. 1) is now visible due to rotation of the bucket 20.

FIGS. 1 and 2 have arrow diagrams indicating direction of movement of jigging arm 32 and balancing arm 24 during operation.

Figure 3:
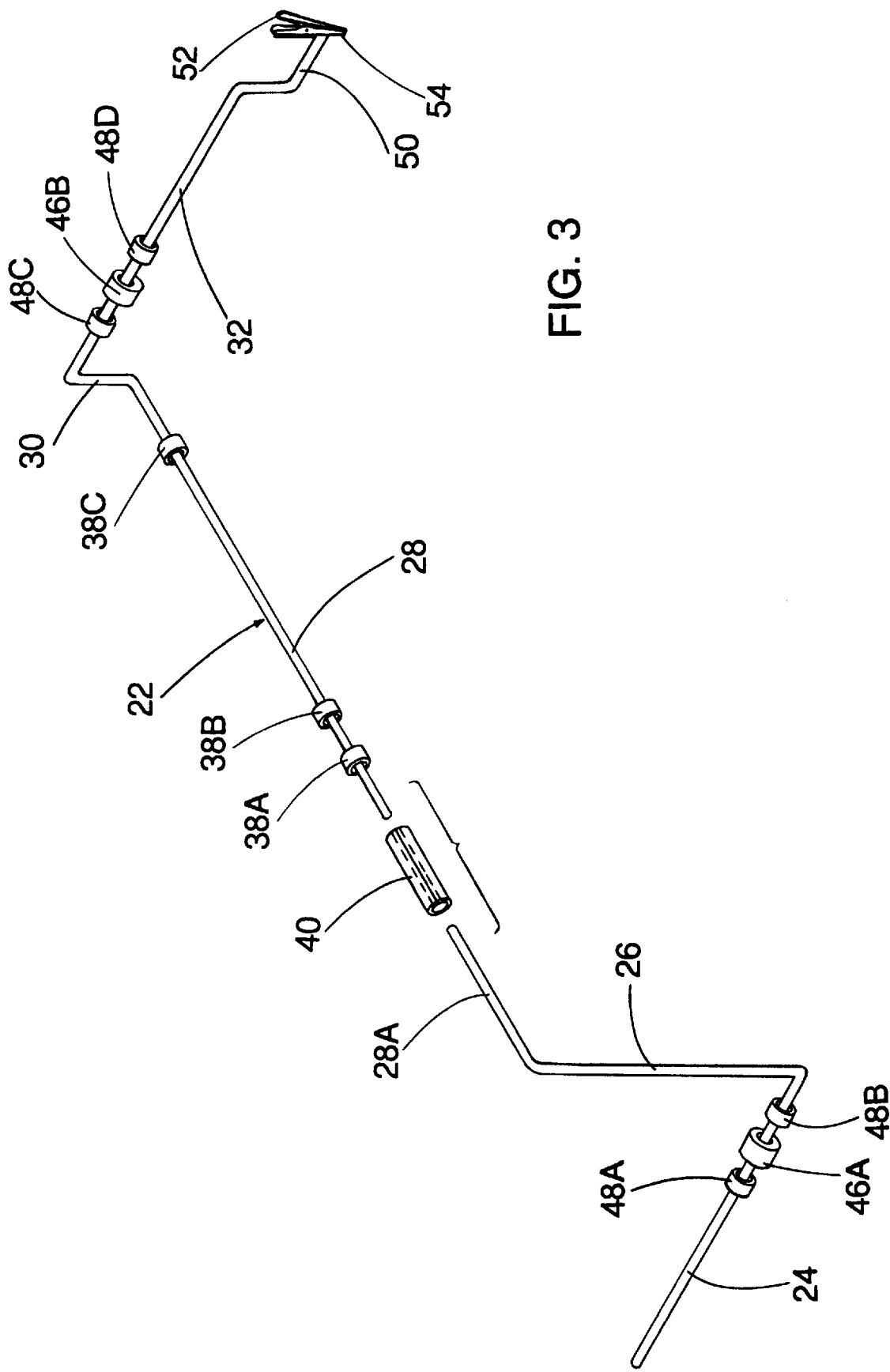
FIG. 3 shows a perspective view of the jigger rod separated at the pivot rod union.

FIG. 3 shows jigger rod 22. Pivot rod extension 28A and pivot rod 28 have been separated from pivot rod union 40. Wind catch 42 has been removed so crank rod 26 and balancing arm 24 can be seen.

Figure 4:
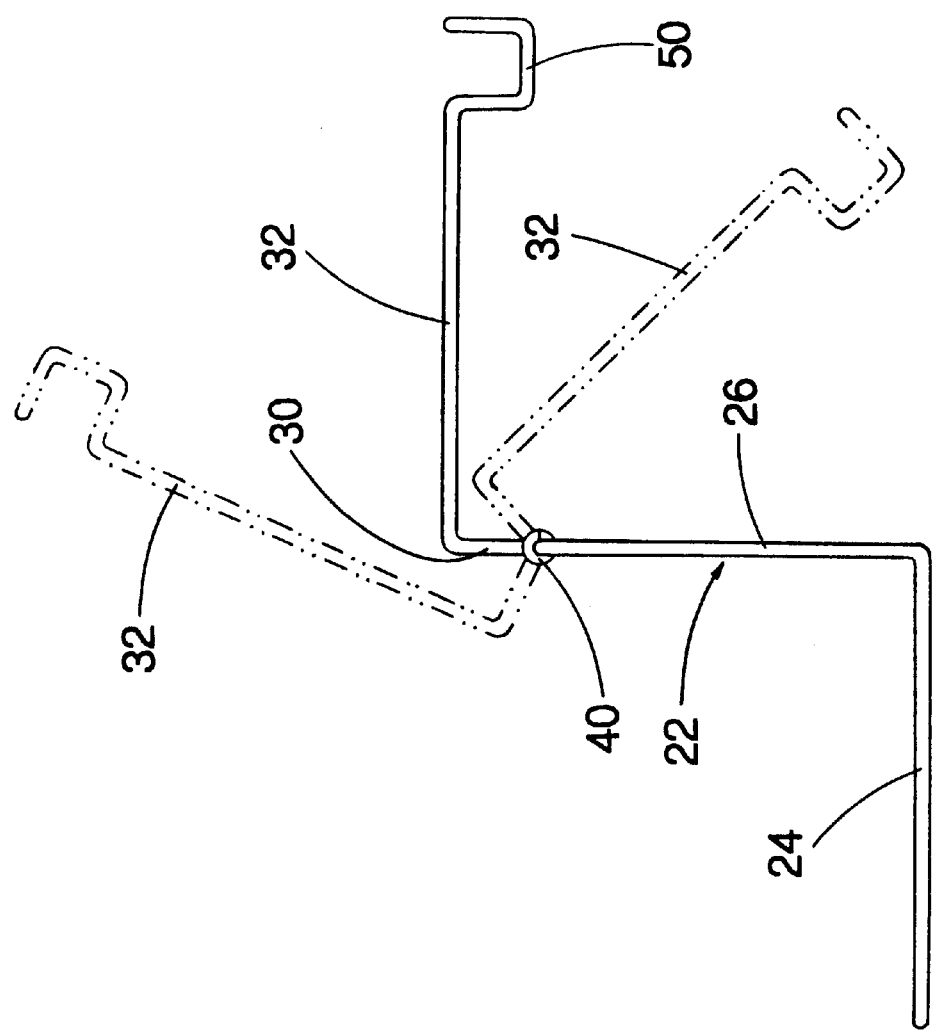
FIG. 4 shows an end view of the jigger rod, the crank rod end nearest viewer (wind catch removed).

FIG. 4 shows an end view of jigger rod 22 with balancing arm 24 and crank rod 26 closest to the viewer. The adjustable relationship between jigging arm 32 and balancing arm 24 is demonstrated. Wind catch 42 and other minor parts are not included. Rotation of pivot rod 28 (not visible because of pivot rod union 40) within pivot rod union 40, with pivot rod union 40 and pivot rod extension 28A remaining stationary, creates three possible positions of jigger arm 32 in relation to balancing arm 24. These three configurations are just a few of the many possible because of pivot rod union 40.

Figure 5:
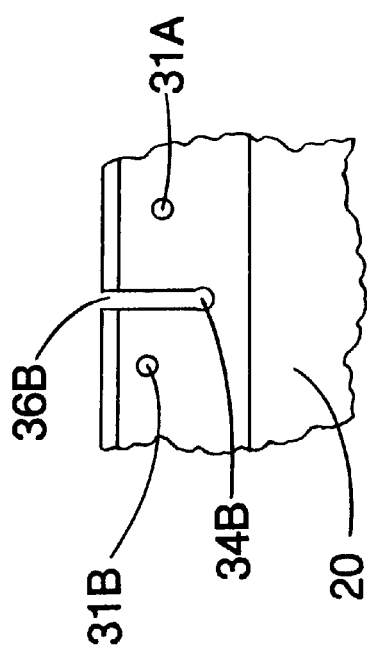
FIG. 5 is a partial side view of the bucket showing the pivot guide of embodiment A.

FIG. 5 is a partial side view of bucket 20 featuring oscillation guide 34B.

Figure 6:
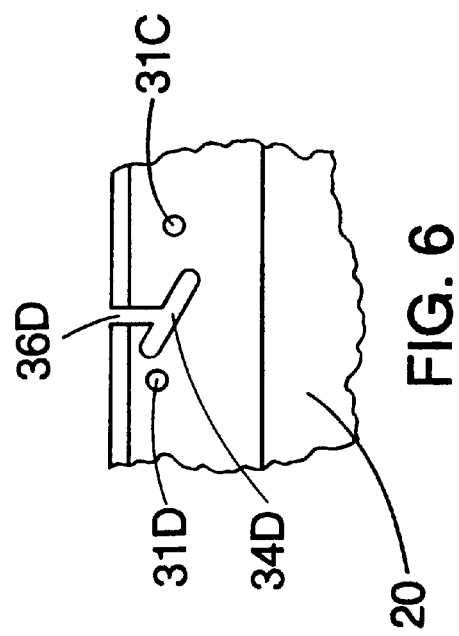
FIG. 6 is a partial side view of the bucket showing the translational pivot guide of embodiment B.

FIG. 6 is a partial side view of bucket 20 featuring translational pivot guide 34D.

Operation of Invention

Theory of Operation And Brief Discussion of Operation

The invention works like a simple machine, the wheel and axle, to jig a bait up and down by the use of wind currents. n this case the wheel is a crank and the axle is a rod. In the present invention crank rod 26 and pivot rod 28 fit the crank and axle characteristics. It is necessary to use this type of simple machine, so that bucket 20 can be used as a base. By use of tis design, the effort arm and the resistance arm are separated by the length of pivot rod 28 and pivot rod extension 28A to give an offset between the two forces. The effort arm is crank rod 26 with wind catch 42, balancing arm 24, and balance weight 46A. The resistance arm is rotation limiter 30, jigging arm 32, balance weight 46B, and fishing line 56 and hook 58. A balance or equilibrium is set between the effort arm and the resistance arm. The jigger rod 22 will operate when wind currents hitting wind catch 42 disrupt the balance. When the wind ceases, jigger rod 22 returns to the original balance position. As the wind is rarely continuous and at the same continuous force, jigging arm 32 lifts and drops hook 58 with variable frequency and degree, depending on the wind gusts. Bucket 20 can be loaded with all the essential fishing tackle and carried to the destination by handle 21.

Detailed Operation of the Invention

Jigger rod 22 oscillates on bucket 20 when the wind blows as pivot rod 28 rides in oscillation guides 34A and 34B. Pivot rod positioners 38A, 38B, and 38C keep pivot rod 28 in the correct position. When the wind hits wind catch 42 on crank rod 26, the balance previously set between balancing arm 24 and jigging arm 32 is upset to cause jigging of hook 58 on fishing line 56. Balance can be achieved through pivot rod union 40 (see FIG. 4), where the position of jigging arm 32 is used to offset balancing arm 24. The balance can also be achieved by moving balance weights 46A and 46B, on balance arm 24 and jigging arm 32, respectively, in conjunction with the use of pivot rod union 40 for configuration adjustments. Balance weights 46A and 46B are retained in position by balance weight positioners 48A and 48B, and 48C and 48D, respectively. For light winds, balance weights 46A and 46B are set to offset each other or about the same distance from pivot rod 28, so a minimal wind moves jigger rod 22. For strong winds, balance weights 46A and 46B can be set to resist too much movement in jigger rod 22. For the purpose of orientation, the flat visible side of wind catch 42 in FIG. 1 and FIG. 2 will be considered the front side and the nonvisible side facing the other direction is the rear side. Presuming the wind is striking the flat side of wind catch 42 from the rear side, moving balance weight 46B closer to line retainer 50, and balance weight 46A closer to wind catch 42, more wind is necessary to create jigging. Thus, the angler can use pivot rod union 40 and balance weights 46A and 46B to control the amount of jigging or the jigging stroke which is the amount line retainer 50 lifts and then drops as it returns to a resting balance position. Generally, the lifting stroke will be a little shorter than the dropping stroke because hook 58, if weighted, falls slightly past the original starting position and then goes back up to the original position. Wind striking the flat side of wind catch 42 from the rear lifts jigging arm 32 and rotation limiter 30 restricts the lifting when it strikes limit pin 31A. Limit pin 31B resists downward rotation of jigger rod 22 when a fish bites. Jigging arm 32 moves downward and rotation limiter 30 hits limit pin 31B, resisting rotation, so that the fish becomes hooked.

As previously suggested, pivot rod union 40 can be used for adjustments in jigger rod 22 for balancing. Balance weights 46A and 46B could actually be removed from balancing arm 24 and jigging arm 32, respectively, and jigger rod 22 would still be functional because pivot rod union 40 can be used to balance jigger rod 22 by a configuration change. Pivot rod union 40 plays a major role in allowing multiple configurations of jigger rod 22 and results in adjustments in how much hook 58 actually lifts and drops during maximum deflection. FIG. 1 shows balance arm 24 and jigging arm 32 to be in a nearly horizontal arrangement. Shown in FIG. 4, pivot rod 28 is rotated within pivot rod union 40, (pivot rod union 40 being held in position), resulting in jigging arm 32 moving to different positions on jigger rod 22, so line retainer 50 can be very close to the ice surface or in a position that could be above the top of bucket 20, or any place between these extremes and even slightly beyond the extremes shown. Thus, pivot rod union 40 allows pivot rod 28 and pivot rod extension 28A to be moved and positioned independently of each other. Pivot rod union 40, being a hollow spring dowel pin with just a slightly smaller inside diameter than the outside diameter of pivot rod 28 and pivot rod extension 28A, allows for rotation of pivot rod 28 to a desired configuration of jigger rod 22, but also is snug enough to frictionally lock the components in position during operation. Balancing weights 46A and 46B are adjusted accordingly for degree of effort needed to move jigger rod 22. Pivot rod union 40 can also be used to separate pivot rod 28 and pivot rod extension 28A (as shown in FIG. 3) to allow for easier transport of jigger rod 22 in bucket 20. Jigger rod 22 can be removed in entirety without separation at pivot rod union 40 from bucket 20 by slipping pivot rod 28 from oscillation guides 34A and 34B through jigger rod removal slots 36A and 36B (or 36C and 36D if jigger rod 22 is in pivot guide 34C and translational pivot guide 34D as shown in FIG. 2).

The right angle between balancing arm 24 and crank rod 26 as well as the right angle between rotation limiter 30 and jigging arm 32 can be changed by bending due to the ductility of jigger rod 22. Bending jigger rod 22 at those areas can give a different geometric configuration, but most adjustments by rotation of pivot rod 28 at pivot rod union 40 would accomplish nearly the same results.

Line 56 can be looped over line retainer 50 (dotted line shown in FIG. 1 and FIG. 2) or placed between clip beaks 54 of line clip 52. A line spool 60 can be placed on bucket 20, where it would not effect balance of jigger rod 22. If line 56 is placed over line retainer 50, this allows for easy removal of line 56 from the device if line clip 52 is not used. This is especially useful if another fishing rod and reel (not shown) is being used so a hooked fish can be played on a fishing rod. The advantage of a fishing rod and reel over a spool 60 is that the angler doesn't have to bring the fishing line 56 in by hand, and it's more fun and has a greater advantage to land a fish.

Since wind currents are gusty and seldom continuous, motion in jigger rod 22 is completely random in occurrence and how much hook 58 actually moves up and down. A light wind gust might only move hook 58 an inch and a strong wind gust many inches. This randomness makes the bait on hook 58 more attractive and natural once it is spotted by a fish, compared to a motion that lifts and drops hook 58 and bait the same distance each oscillation in a continuous manner.

Besides the up and down movement produced by the device, jigger rod 22 being of 3/32 inch (2.38 mm) wire, is flexible or springy enough that some vibration of jigging arm 32 takes place resulting in vibration of line retainer 50 and line clip 52, that translates to added movement in hook 58. This vibration originates at wind catch 42 as wind flutters wind catch 42 on crank rod 26, much like a flat sign on a single pole flutters in the wind.

Balance weight positioners 48C and 48D can be placed to confine movement of balance weight 46B as shown in FIG. 3. However they can be spread as shown in FIG. 1, with considerable space between them to allow balance weight 46B to freely slide the length of jigging arm 32, thus the use of dynamic shifting weights. Dynamic shifting weights cause the resistance arm and the effort arm to change throughout the jigging stroke, and are not constant as when balance weight 46A and 46B are confined to one particular place. Balance weight 46B freely slides the length of jigging arm 32 producing bumps as balance weight 46B hits balance weight positioners 48C and 48D, causing a twitch or vibration of the end of the semi-flexible jigging arm 32 and in turn causing an extra jump in hook 58 at the end of each lifting and dropping stroke.

Another effect of the balance weight 46B sliding on jigging arm 32 and bumping into weight positioners 48C and 48D is to produce noise that is carried through the line 56 and around the water surrounding the line 56 and hook 58 to attract fish to the immediate area. When balance weight 46B slides on jigging arm 32, the speed of the jigging stroke is changed, in contrast to the situation where balance weight 46B is confined in a certain spot by balance weight positioners 48C and 48D. As an example, say balance weight positioners 48C and 48D are separated as in FIG. 1, and balance weight 46B is nearest balance weight positioner 48D to start. The wind blows lifting jigging arm 32 upwards. Balance weight 46B starts traveling towards balance weight positioner 48C. The speed at which balance weight 46B approaches balance weight positioner 48C increases as it falls, thus causing the jigging stroke to be faster than when balance weight 46B is confined to one position. As the wind subsides and jigging arm 32 drops to it's original position, balance weight 46B slides down jigging arm 32 towards balance weight positioner 48D, picking up speed as it falls to it's final destination. Thus this mechanism allows for adjusting the speed of the jigging stroke to some degree. Balance weight 46A can be used on balancing arm 24 in the same way. Another possibility is that balance weights 46A and 46B could be sliding on balancing arm 24 and jigging arm 32, respectively, at the same time, and bumping into balance weight positioners 48A and 48B, and 48C and 48D at different times in the jigging stroke to create bumps at different times, causing further action in hook 58, beyond a simple lift and drop jigging stroke. As previously noted, jigger rod 22 is functional without balance weights 46A and 46B due to configuration changes of jigger rod 22 by pivot rod union 40. Just as balance weights 46A and 46B can be removed, additional weights can be added to those already present when needed with the added benefit of the weights sliding and bumping into each other producing noise down fishing line 56.

FIGS. 2 and 6 demonstrate an embodiment B which uses translational pivot guide 34D. Translation signifies change in position without rotation. Translational pivot guide 34D changes the device from a lift and drop jigging device to a device that translates jigger rod 22, resulting in pulling hook 58 to the side, as well as performing the lift and drop function. When jigger rod 22 is at rest, pivot rod 28 occupies a position at the highest point (nearest line retainer 50) in the sloped slot of translational pivot guide 34D. This is possible because the side on which crank rod 26 is located is slightly heavier than jigging arm 32 side of jigger rod 22, as pivot guide 34C acts as a balancing point for jigger rod 22. As wind strikes the rear face of wind catch 42, pivot rod 28 pivots at pivot guide 34C causing pivot rod 28 to move (translate) down the sloped slot of translational pivot guide 34D to a lower position causing line clip 52 to pull line 56 to the side and back towards the bucket 20 in a slight arc. (The free end of balancing arm 24 shows a corresponding side to side motion.) The arc has a radius of a straight line from pivot guide 34C to line clip 52, since pivot guide 34C is acting as a pivot point. When pivot rod 28 hits the lowest position of translational pivot guide 34D, it causes the terminal end of jigging arm 32 to lift When the wind subsides the terminal end of jigging arm 32 drops down and pivot rod 28 moves up the translational pivot guide 34D to it's original position causing a pull of line 52 away from bucket 20. As pivot rod 28 moves in translational pivot guide 34D, it hits jigger rod removal slot 36D, located about midway in the upper portion of the sloped slot of translational pivot guide 34D, to cause a bump that causes a jump in hook 58. Now, to look at the resulting movements of hook 58 through the entire sequence. Initially hook 58 is pulled backwards in an arc toward the device as pivot rod 28 moves down translational pivot guide 34D. Hook 58 jumps as it hits jigger rod removal slot 36D. Hook 58 continues backwards in an arc and when pivot rod 28 is at the bottom of translational pivot guide 34D, hook 58 moves upwards as jigging arm 32 lifts up. When the wind subsides hook 58 returns to it's original position, in reverse sequence of action, unless interrupted at some point by another wind gust It is also possible that wind gusts would only translate jigger rod 22 and not rotate jigger rod 22 until sufficient wind gusts occurred, because less wind is necessary to translate jigger rod 22 than to oscillate jigger rod 22. It is also possible that a quick gust of wind hitting wind catch 42 while pivot rod 28 is translating in translational pivot guide 34D could cause oscillation at any point in the slot of translational pivot guide 34D. Wind gusts, being very unpredictable, make it somewhat hard to predict the exact nature of motion of jigger rod 22, which lends well to attracting and catching fish, the ultimate goal. The advantage of the initial pull to the side can be seen with some swimming type jigs that can show swimming properties when pulled, rather than just simple up and down movement of the bait. If sliding movement of balance weights 46A and 46B on balancing arm 24 and jigging arm 32, respectively, are considered as an option in conjunction with translational pivot guide 34D, then a very complex set of movements of hook 58 is possible over and beyond simple up and down, lift and drop jigging.

With the use of translational pivot guide 34D, the device is still functioning as a crank and axle, but now it also is using pivot guide 34C as a single pivot point as pivot rod 28 translates in position from the top and bottom positions of translational pivot guide 34D.

So far, all wind gusts have come from the rear of wind catch 42, resulting in hook 58 traveling in an upward jigging stroke from a rest position, when sufficient wind was present. It is possible that in embodiment A the wind can strike wind catch 42 from the front side, in which case instead of an initial lifting stroke occurring, the dropping stroke (the terminal end of jigging arm 32 dropping downwards) would occur first, and the wind ceasing would result in an upward stroke of jigging arm 32 to return to a resting or balancing position. This would be important in whether the ice angler wanted an initial lift of hook 58 from rest position or drop from a rest position. How the fish were striking would determine the angler's preference of how the device was oriented to the wind direction. Placing the device, using embodiment A or B, so that wind gusts were hitting the thin edge of wind catch 42, could take advantage of rotation of the jigger rod 22 in both directions.

If rotation limiter 30 bumps into limit pins 31A, 31B, 31C, or 31D, it can also cause vibration in jigging arm 32, causing jumps in hook 58. The angler may not want to limit the motion of jigging arm 32 or have the advantages of using limit pins 31A, 31B, 31C, and 31D, in which case any or all of them could be removed from bucket 20, and jigger rod 22 would still function as a jigging device on bucket 20 without them.

Conclusion, Ramifications, and Scope of the Invention

Accordingly, the reader can see the jigging device of this invention can easily utilize plastic bucket 20 as a foundation. The jigging device is very lightweight and easily attaches or detaches from bucket 20 for transport. Bucket 20 of the device is able to carry extra fishing tackle as well as jigger rod 22. The device uses a simple crank and axle design so bucket 20 can be used for a base, distinguishing itself from prior art jigging devices. The use of wind catch 42 mounted on crank rod 26 gives a new and unexpected result as it's flutter translates to vibration at line retainer 50 and added motion at hook 58, beyond simple up and down jigging. This is a unique quality not demonstrated in prior art models. The invention harnesses wind energy to power the jigger. The device is easy to adjust for weak or strong winds and can be used by anglers of all ages. Pivot rod union 40 allows the jigging device to have many configurations, translating to versatility and adaptability in jigging in variable wind conditions and when changing to differently weighted jigs. The device could be used for fishing on a dock as well as for ice fishing. The jigger is of simple construction and is easy to manufacture. The device is designed so a separate fishing rod and reel can be used to play and land a fish as the fishing line can be easily lifted off the device.

The use of dynamic shifting weights allows for some unique jigging action. By the use of balance weight 46A sliding on balancing arm 24 and balance weight 46B sliding on jigging arm 32, some bumps become resulting jumps in hook 58 and fish attracting noise is transferred down line 56 and the surrounding water. The speed of the jigging stroke can also be changed. These advantages are not seen in prior art jigging devices.

Embodiment B using translational pivot guide 34D, while possessing the lift and drop jigging stroke of embodiment A, goes a step further to include a side pulling action, as well, as pivot rod 28, pivoting in pivot rod guide 34C, slides in sloped slot of translational pivot guide 34D. Embodiment B can have the same bumps of sliding balance weights 46A and 46B plus a bump that can occur as pivot rod 28 travels in the sloped slot of translational pivot guide 34D as pivot rod 28 hits jigger rod removal slot 36D. Prior art jigging devices have not demonstrated the new actions described in embodiments A and B.

To make the specification complete some things were described that improve and expand the use of jigger rod 22 but could be considered optional. Balance weights 46A and 46B and their balance weight positioners 48A, 48B, 48C, and 48D, limit pins 31A, 31B, 31C, and 31D, and line clip 52 are optional but improve the workability of jigger rod 22 on bucket 20.

Although the description above contains some specifications, these should not be construed as limiting the scope of the invention, but merely providing illustration of this invention. For instance, minor changes in the way jigger rod 22 is bent can give a different appearance, but the changes do little to improve the actual function of the device. The angler might actually bend jigger rod 22 slightly between balancing arm 24 and crank rod 26 or between rotation limiter 30 and jigging arm 32 to meet their needs since jigger rod 22 is of a ductile material. However, with adjustments of balance weights 46A and 46B and angle changes at pivot rod union 40, most adjustments can be made.

Jigging arm 32 could be lengthened for use on taller buckets resulting in an increase in the length of the jigging stroke. By placing a union on jigging arm 32, different lengths could easily be changed to accommodate the length needed. A union on jigging arm 32 could also allow the use of a smaller gauge wire contributing to greater flexibility and vibration potential at line retainer 50. With a union on the jigging arm 32, a different material other than wire could be used for the terminal end of jigging arm 32, such as fiberglass or graphite, to enhance the jigging, vibration, and sensitivity.

Having thus described the invention, I claim:

1. A wind moderated fishing device for jigging and vibrating a fishing lure or bait comprising:
   (a) a bucket with an opening, whereby fishing tackle can be carried;
      (i) a rim on the opening of said bucket;
   (b) a pivot guide on said bucket near said rim;
   (c) a translational pivot guide with a sloped slot on said bucket near said rim;
      (i) said translational pivot guide and said pivot guide straddling the opening of said bucket;
   (d) a jigger rod that comprises a plurality of bends and angles, further comprising;
      (i) a balancing arm on one end of said jigger rod;
      (ii) a crank rod that is continuous with said balancing arm and meets said balancing arm at substantially a right angle;
      (iii) a pivot rod extension that is continuous with said crank rod and meets said crank rod at substantially a right angle;
      (iv) a pivot rod that pivots and oscillates in said pivot guide and translates and oscillates in said translational pivot guide;
      (v) a pivot rod union that joins said pivot rod extension and said pivot rod whereby said jigger rod can be separated for transport, said pivot rod union allowing said pivot rod and said pivot rod extension to be moved and positioned independently of each other to give said jigger rod a plurality of configurations;
      (vi) a rotation limiter that is continuous with said pivot rod and meets said pivot rod at substantially a right angle;
      (vii) a jigging arm that is continuous with said rotation limiter and meets said rotation limiter at substantially a right angle, whereby said jigging arm and said balancing arm oppose and balance rotational forces of said pivot rod in said translational pivot guide and said pivot guide;
      (viii) a fishing line retainer on a terminal end of said jigging arm;
   (e) a wind catch mounted on said crank rod so that wind striking said wind catch causes said jigger rod to pivot and oscillate in said pivot guide and to translate and oscillate in said translational pivot guide, whereby said line retainer on said jigging arm moves up and down and sideways;
   (f) a pivot rod positioning means, whereby said pivot rod is positioned in said pivot guide and said translational pivot guide.

2. The device in claim 1 that further comprises a line clip on said fishing line retainer.

3. The device in claim 1 wherein said pivot rod union further comprises an adjusting means that allows said pivot rod to rotate inside said pivot rod union so that said jigging arm is position adjustable in relation to said balancing arm giving said jigger rod a plurality of possible configurations.

4. The device in claim 1 further comprising a balancing means for said jigger rod.

5. The device in claim 1 further comprising an oscillation limiting means whereby said jigger rod has up and down limits for said jigging arm.

6. The device in claim 1 further comprising a pair of oscillation guides on said bucket straddling the opening of said bucket, whereby said jigger rod can be placed in said pair of oscillation guides, can oscillate in said pair of oscillation guides to cause said line retainer on said jigging arm to move up and down.

7. The device in claim 6 that further comprises jigger rod removal slots for said pivot guide, said translational pivot guide, and said oscillation guides, whereby said jigger rod can be removed from said bucket.

8. A wind moderated fishing device for jigging and vibrating a fishing lure or bait comprising:
   (a) a bucket, with an opening, whereby fishing tackle can be carried;
      (i) a rim on the opening of said bucket;
   (b) two oscillation guides on said bucket near said rim;
      (i) said oscillation guides straddling the opening of said bucket;
   (c) a jigger rod that comprises a plurality of bends and angles, further comprising;
      (i) a balancing arm on one end of said jigger rod that is essentially horizontal;
      (ii) a crank rod that is substantially vertical and continuous with said balancing arm;
      (iii) a pivot rod extension that is substantially horizontal and continuous with said crank rod;
      (iv) a pivot rod that is substantially horizontal that oscillates in said oscillation guides;
      (v) a pivot rod union that joins said pivot rod extension and said pivot rod whereby said jigger rod can be separated for transport, said pivot rod union allowing said pivot rod and said pivot rod extension to be moved and positioned independently of each other to give said jigger rod a plurality of different configurations;
      (vi) a rotation limiter that is substantially at a right angle and continuous with said pivot rod;
      (vii) a jigging arm that is continuous with and at substantially a right angle to said rotation limiter, said jigging arm and said balancing arm opposing and balancing rotational forces of said pivot rod in said oscillation guides;
      (viii) a fishing line retainer on a terminal end of said jigging arm;
   (d) a wind catch mounted on said crank rod so that wind striking said wind catch causes said jigger rod to vibrate and to oscillate in said oscillation guides;
   (e) an oscillation limiting means, whereby said jigging arm has limits to up and down movements;
   (f) a plurality of balance weights on said jigging arm and said balancing arm, whereby said jigger rod can be balanced;
   (g) a plurality of balance weight positioners on said jigging arm and said balancing arm, whereby said balancing weights can be positioned;
   (h) a plurality of pivot rod positioners on said pivot rod whereby said pivot rod can be positioned in said oscillation guides.

9. The device in claim 8 that further comprises a line clip on said fishing line retainer.

10. The device in claim 8 in which said pivot rod union further comprises an adjusting means that allows said pivot rod to rotate inside said pivot rod union so that said jigging arm is position adjustable in relation to said balancing arm giving said jigger rod a plurality of possible configurations.

11. The device in claim 8 whereby said balance weights can slide on said jigging arm and said balance arm, to change the speed of the jigging stroke.

12. The device in claim 8 wherein said pivot rod union is a spring dowel pin, whereby said pivot rod and said pivot rod extension can move independently of each other to give different configurations of said jigger rod.

13. The device in claim 8 further comprising a pivot guide on said bucket near said rim.

14. The device in claim 13 further comprising a translational pivot guide on said bucket, near said rim, said translational pivot guide and said pivot guide straddling the opening of said bucket, whereby said jigger rod can be placed in said pivot guide and said translational pivot guide, and can pivot and oscillate in said pivot guide and can translate and oscillate in said translational pivot guide to cause said line retainer on said jigging arm to move up and down and sideways.

15. The device in claim 14 that further comprises jigger rod removal slots for said oscillation guides, said pivot guide, and said translational pivot guide, whereby said jigger rod can be removed from said bucket.

16. A wind moderated fishing device for jigging and vibrating a fishing lure or bait comprising:
   (a) a bucket with an opening, whereby fishing tackle can be carried;
      (i) a rim on the opening of said bucket;
   (b) a pivot guide on said bucket near said rim;
   (c) a translational pivot guide with a sloped slot on said bucket near said rim;
      (i) said translational pivot guide and said pivot guide straddling the opening of said bucket;
   (d) a jigger rod that comprises a plurality of bends and angles, further comprising;
      (i) a balancing arm on one end;
      (ii) a crank rod that is continuous with said balancing arm and meets said balancing arm at substantially a right angle;
      (iii) a pivot rod extension that is continuous with said crank rod and meets said crank rod at substantially a right angle;
      (iv) a pivot rod that pivots and oscillates in said pivot guide and translates and oscillates in said translational pivot guide;
      (v) a pivot rod union that joins said pivot rod extension and said pivot rod whereby said jigger rod can be separated for transport, said pivot rod and said pivot rod extension being able to be moved independently of each other to give said jigger rod a plurality of different configurations;
      (vi) a rotation limiter that is continuous with said pivot rod and meets said pivot rod at substantially a right angle;
      (vii) a jigging arm that is continuous with said rotation limiter and meets said rotation limiter at substantially a right angle, whereby said jigging arm and said balancing arm oppose and balance rotational forces of said pivot rod in said translational pivot guide and said pivot guide;
      (viii) a fishing line retainer on a terminal end of said jigging arm;
   (e) a wind catch mounted on said crank rod so that wind striking said wind catch causes said jigger rod to pivot and oscillate in said pivot guide and to translate and oscillate in said translational pivot guide, whereby said line retainer on said jigging arm moves up and down and sideways;
   (f) an oscillation limiting means whereby said jigging arm is limited in up and down movements;
   (g) a plurality of balance weights on said jigging arm and said balancing arm, whereby said jigger rod can be balanced;
   (h) a plurality of balance weight positioners on said jigging arm and said balancing arm, whereby said balancing weights can be positioned;
   (i) a plurality of pivot rod positioners on said pivot rod whereby said pivot rod can be positioned in said pivot guide and said translational pivot guide.

17. The device in claim 16 that further comprises a line clip on said fishing line retainer.

18. The device in claim 16 wherein said pivot rod union further comprises an adjusting means that allows said pivot rod to rotate inside said pivot rod union so that said jigging arm is position adjustable in relation to said balancing arm giving said jigger rod a plurality of possible configurations.

19. The device in claim 16 further comprising a pair of oscillation guides straddling the opening of said bucket, whereby said jigger rod can be placed in said pair of oscillation guides, can oscillate in said pair of oscillation guides to cause said line retainer on said jigging arm to move up and down.

20. The device in claim 19 that further comprises jigger rod removal slots for said pivot guide, said translational pivot guide, and said oscillation guides whereby said jigger rod can be removed from said bucket.

* * * * *